(12) United States Patent
Senese et al.

(10) Patent No.: US 8,824,681 B2
(45) Date of Patent: Sep. 2, 2014

(54) METHOD AND DEVICE FOR LINK LAYER DECRYPTING AND/OR ENCRYPTING A VOICE MESSAGE STREAM ALREADY SUPPORTING END TO END ENCRYPTION

(71) Applicant: Motorola Solutions, Inc., Schaumburg, IL (US)

(72) Inventors: Thomas J. Senese, Schaumburg, IL (US); Chris A. Kruegel, Plainfield, IL (US); Michael C. Petrie, Hoffman Estates, IL (US); Harish Natarahjan, Streamwood, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 0 days.

(21) Appl. No.: 13/671,744

(22) Filed: Nov. 8, 2012

(65) Prior Publication Data

US 2013/0142335 A1 Jun. 6, 2013

Related U.S. Application Data

(60) Provisional application No. 61/567,198, filed on Dec. 6, 2011.

(51) Int. Cl.
*H04K 1/00* (2006.01)
*H04L 29/06* (2006.01)
*H04W 12/08* (2009.01)
*H04W 12/02* (2009.01)

(52) U.S. Cl.
CPC ............. *H04L 63/162* (2013.01); *H04W 12/08* (2013.01); *H04L 63/04* (2013.01); *H04W 12/02* (2013.01)
USPC ........................................................ 380/270

(58) Field of Classification Search
CPC .............................. H04L 63/162; H04W 12/08
USPC .................. 713/151–152; 380/270, 277–278; 726/14
See application file for complete search history.

(56) References Cited

U.S. PATENT DOCUMENTS

| 5,517,021 A | 5/1996 | Kaufman et al. |
| 8,250,362 B2 * | 8/2012 | Chen et al. ..................... 713/160 |
| 8,270,611 B2 * | 9/2012 | Boerger ....................... 380/277 |

(Continued)

OTHER PUBLICATIONS

"Wireless LAN Medium Access Control (MAC) and Physical Layer (PHY) Specifications," IEEE 802.11 standard: Mar. 29, 2012; Section 11.2.2.

(Continued)

*Primary Examiner* — Samson Lemma
(74) *Attorney, Agent, or Firm* — Daniel R. Bestor

(57) ABSTRACT

Methods and systems for LLE encrypting and decrypting voice message streams (VMSs) already supporting eTe encryption are disclosed. In one example, LLE and eTe encryption initialization vectors (EIVs) are interleaved such that an LLE EIV retrieved from one of a header and a data unit is used to LLE decrypt both the header or data unit and a subsequent data unit. A recovered eTe EIV is used to eTe decrypt voice payloads in one or more subsequent data units. In another example, a base station dynamically LLE encrypts a VMS already supporting eTe encrypting by determining whether a received VMS is eTe encrypted, and ii it is not generating a new LLE EIV, and if it is, re-using the pre-existing eTe EIV for LLE encryption. The LLE encrypted (and perhaps eTe encrypted) VMS is then sent over the air to one or more mobile stations.

20 Claims, 9 Drawing Sheets

(56) References Cited

U.S. PATENT DOCUMENTS

| | | | | |
|---|---|---|---|---|
| 8,447,968 B2* | 5/2013 | Patel et al. | ................... | 713/151 |
| 2005/0220307 A1* | 10/2005 | Boerger | ................... | 380/277 |
| 2006/0115088 A1 | 6/2006 | Valentine et al. | | |
| 2007/0101120 A1* | 5/2007 | Patel et al. | ................... | 713/151 |
| 2010/0146266 A1* | 6/2010 | Chen et al. | ................... | 713/160 |

OTHER PUBLICATIONS

"Wireless LAN Medium Access Control (MAC) and Physical Layer (PHY) Specifications," IEEE 802.11 standard: Mar. 29, 2012; Section 11.6.7.

"Wireless LAN Medium Access Control (MAC) and Physical Layer (PHY) Specifications," IEEE 802.11 standard: Mar. 29, 2012; Section 11.6.8.

"Terestrial Trunked Radio (TETRA)," Voice Plus Data; ETSI EN 300 392-7; Aug. 31, 2006; Section 6.3.2.1.

"Digital Land Mobile Radio," TIA Standard 102.AAAB-A; Jan. 6, 2005; Section 3.1.

"Access Control Layer Description," TIA Standard 102.BBAC; Dec. 2010; Section 8.2.1.

"Access Control Layer Description," TIA Standard 102.BBAC; Dec. 2010; Section 4.2.

"FDMA-Common Air Interface," TIA Standard 102.BAAA-A; Sep. 2003; Section 5.4.

"Digital Land Mobile Radio Block Encryption Protocol," TIA Standard 102.AAAD-A; Aug. 2009; Section 5.5.

"Digital Land Mobile Radio Block Encryption Protocol," TIA Standard 102.AAAD-A; Aug. 2009; Section 4.

"Digital Land Mobile Radio Block Encryption Protocol," TIA Standard 102.AAAD-A; Aug. 2009; Section 5.3.

PCT International Search Report Dated Feb. 26, 2013 for Counterpart Application PCT/US2012/065395.

* cited by examiner

METHOD AND DEVICE FOR LINK LAYER DECRYPTING AND/OR ENCRYPTING A VOICE MESSAGE STREAM ALREADY SUPPORTING END TO END ENCRYPTION

FIELD OF THE DISCLOSURE

The present disclosure relates to a processor, a method and a device for link layer encrypting (LLE) and or decrypting voice message streams that may or may not already include end-to-end encryption (eTe) in a radio system.

BACKGROUND

Wireless communication systems provide for radio communication links to be arranged within the system between a plurality of user terminals. Such user terminals may be mobile and may therefore be known as 'mobile stations.' At least one other terminal, e.g. used in conjunction with mobile stations, may be a fixed terminal, e.g. a control terminal, base station, or access point. Such a system typically includes a system infrastructure which generally includes a network of various fixed installations such as base stations, which are in direct radio communication with the mobile stations. Each of the base stations operating in the system may have one or more transceivers which may, for example, serve mobile stations in a given local region or area, known as a 'cell' or 'site', by radio frequency (RF) communication. The mobile stations which are in direct communication with a particular base station are said to be served by the base station, and all radio communications to and from each mobile station within the system are made via respective serving base stations. Sites of neighbouring base stations in a wireless communication system may be offset from one another or may be overlapping.

Wireless communication systems may operate according to an industry standard protocol such as, for example, the Project 25 (P25) standard defined by the Association of Public Safety Communications Officials International (APCO), or other radio protocols. Further details regarding, the P25 standards can be obtained from the Telecommunications Industry Association, 2500 Wilson Boulevard, Suite 300 Arlington, Va. Communications in accordance with P25 or other standards may take place over physical channels in accordance with one or more of a TDMA (time division multiple access) protocol, a FDMA (frequency divisional multiple access), or CDMA (code division multiple access) protocol. Mobile stations in wireless communication systems such as P25 systems send use communicated speech and data, herein referred to collectively as 'traffic information', in accordance with the designated protocol.

Many wireless communication systems, including many P25 systems, employ a procedure to encrypt sensitive communicated traffic information, especially where the information is sent via insecure channels, e.g. by wireless communication over-the-air. For example, in some wireless communication systems, communications can be end-to-end encrypted. This means that encryption of traffic information is applied by an original transmitting terminal of the sender (source) of the traffic information and removed by a final receiving terminal of the recipient (destination) of the traffic information. Intermediate terminals that facilitate the delivery of the encrypted traffic information are unable to decrypt the encrypted traffic information (or at least, are unable to do so in a reasonable amount of time).

FIG. 1 illustrates an example of how encryption may be achieved between a transmitter 101 and receiver 103 over an intervening channel 105 by producing a random or pseudo-random data sequence of binary digits (e.g., an encryption initialization vector 111) and using a combining procedure (e.g., an encryption algorithm 115) to combine the encryption initialization vector 111 with a secret key variable 113 supplied by the user. The combination generates another data sequence, known as a keystream, incorporating the secret key variable 113. The keystream, or a portion of it, is then used internally by the encryption algorithm 115 to encrypt the user traffic information 117 to be transmitted in encrypted form as encrypted traffic information 133. This is done in an encryption processor by using a combination procedure, such as an XOR (exclusive OR) combination procedure, to combine the unencrypted traffic information 117 with the keystream, e.g. on a frame-by-frame basis. The encryption initialization vector 111 may be loaded into a linear feedback shift register (LFSR), for example, and may be clocked to provide a time-varying keystream.

The secret key variable 113 used at the transmitter 101 is known at the receiver 103 and is thus never transmitted openly. The receiver 103 is sent the encryption initialization vector 111, an identifier identifying the encryption algorithm 115 used at the transmitter 101 (assuming it is not hardcoded in both transmitter 101 and receiver 103), and an identifier identifying the key variable 113 used at the transmitter 101 (assuming it is not hardcoded in both transmitter 101 and receiver 103) via a sync block 131 transmitted over the channel 105 and included in one or more of a header information structure or embedded in a data payload frame. The transmitter 101 also transmits the encrypted traffic information 133 over the channel 105 for reception by the receive 103. The receiver 103 is thereby able to re-construct the keystream applied at the transmitter 101. The receiver 103 combines the reconstructed keystream with the encrypted traffic 133 it receives in a manner such that the keystream included in the encrypted traffic 133 is cancelled allowing the original user traffic 163 to be extracted in unencrypted form. For example, the receiver 103 may use a same clocked LFSR as used by the transmitter 101 to provide a same time-varying keystream using the retrieved encryption initialization vector 111 transmitted in the sync block 131.

The end-to-end encryption process therefore typically includes (i) operation of an encryption algorithm in a processor of a transmitting terminal to encrypt the information to be transmitted, and (ii) operation of a related decryption algorithm in a receiving terminal to decrypt the received encrypted traffic information. As noted, the encryption process has to be synchronised between the transmitting terminal and the receiving terminal. The transmitting terminal must send to the receiving terminal information concerning the state of the encryption algorithm being run in the transmitting terminal to allow the receiving terminal to synchronise its decryption algorithm with the received signal.

As already alluded to above, synchronisation information may be sent from the transmitting terminal to the receiving terminal in several different ways. In a first method, synchronisation information is embedded in a stream of traffic information (e.g. voice payloads including digitized speech audio data or other data). In each consecutive encrypted frame of traffic information, a portion of the traffic information may be replaced by additional embedded synchronisation information. Synchronisation information portions retrieved from a single frame or from several frames may then be collected to form a complete set of synchronisation information to allow the receiver to begin decryption. Thus, a disadvantage of this first known method is that queuing of received traffic information frames may have to occur until all of the traffic information frames containing the several portions of embedded synchronisation information have been received. This first method may thus cause audio reproduction delays and/or truncation of voice message streams.

In a second known method, an initial full traffic information frame is replaced by synchronisation information in a complete synchronisation frame. This synchronization frame contains all of the information needed to begin decryption. This may be followed by a sequence of full traffic information frames containing no additional synchronisation information embedded therein. Thus, no queuing of received traffic information frames needs to take place because the receiving terminal can begin without delay decryption of the first full traffic information frame received directly after the complete synchronisation frame. However, this second known method has the disadvantage that if the initial synchronisation frame is missed by the receiving terminal, e.g. because the receiving terminal has made a late entry into the process of receiving the communication, the receiving terminal is unable to decrypt any of the subsequently received traffic information.

In addition to end-to-end encryption, link layer encryption may additionally be used between individual links to further prevent the interception or monitoring of traffic information transmitted over-the-air, such as between mobile stations and base stations. For example, even when end-to-end encryption is used to encrypt digitized voice data, some control and/or signalling data is necessarily sent unencrypted over-the-air to allow the receiving device (such as the base station or mobile station) to identify a sender or receiver, talkgroup ID, or to obtain information such as an algorithm ID or key ID sufficient to begin decrypting the end-to-end encrypted voice payload data. However, established protocols such as P25 may not provide sufficient signalling space in the established control procedures to introduce a second layer of encryption to the existing end-to-end encryption without incurring substantial delays and/or performance degradation. Furthermore, established protocols do not provide a way for a base station to dynamically provide link layer encryption for both end-to-end encrypted and non end-to-end encrypted voice calls.

DETAILED DESCRIPTION

Figure 1:
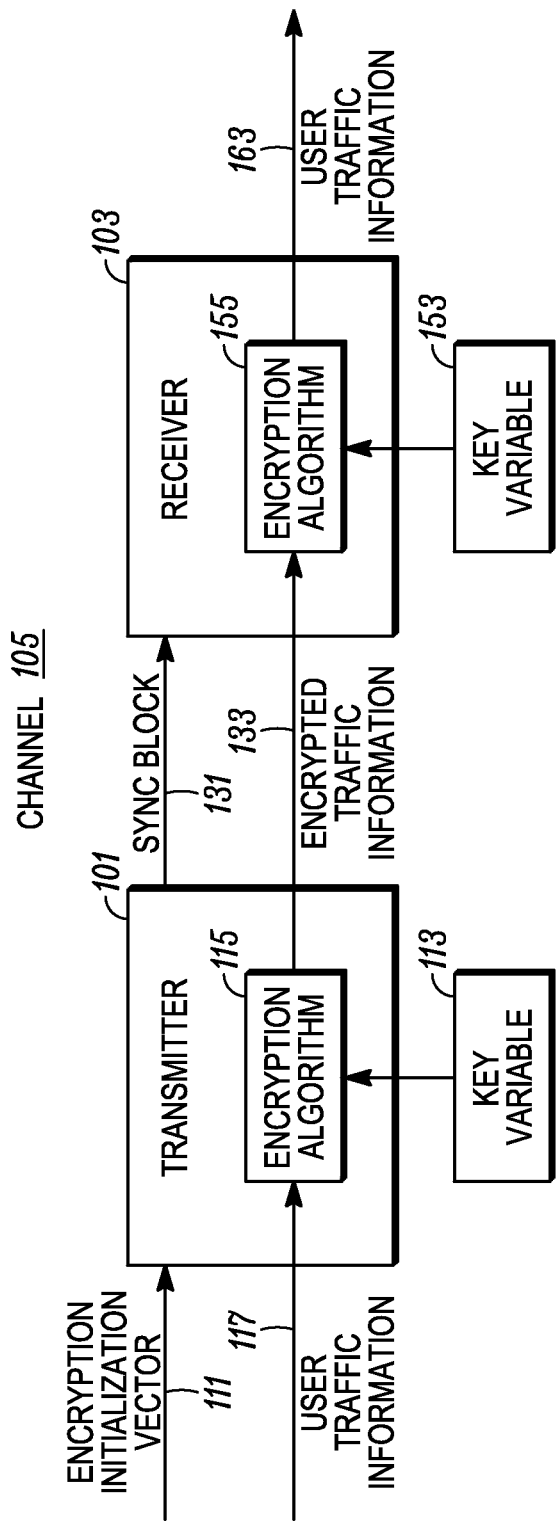
FIG. 1 is a block diagram illustrative of a conventional encryption/decryption system.

Accordingly, it would be advantageous to introduce a radio system and method, applicable to protocols such as P25 that enables both end-to-end encryption (eTe) of traffic information and link layer encryption (LLE) of the end-to-end encrypted traffic information, and does so in a more useful and intelligent manner. In addition, it would be advantageous to introduce a system and method, applicable to protocols such as P25, that enables a base station to dynamically provide link layer encryption for both end-to-end encrypted and non end-to-end encrypted voice message streams, while minimizing incurred signalling overhead and delays.

In one example, a base station may decrypt and forward an LLE and eTe encrypted voice message stream by receiving one of a voice header and as second logical data unit of the voice message stream, retrieve an encryption initialization vector from the one of the voice header and the second logical data unit, use the retrieved encryption initialization vector to link layer decrypt both (i) the one of the voice header and the second logical data unit and (ii) a first logical data unit of the voice message stream following the one of the voice header and the second logical data unit, recover end-to-end encryption parameters from the one of the voice header and the second logical data unit for decrypting end-to-end encrypted voice payloads in one or more subsequent logical data units (LDUs) in the voice message stream, and forward the end-to-end encrypted voice message stream towards its destination.

In another example, a base station may LLE encrypt and transmit a voice message stream to one or more mobile stations within its service area by receiving a voice message stream including one of a header portion and an embedded payload portion, having end-to-end (eTe) encryption parameter fields, for transmission to one or more mobile stations operating within a coverage area associated with the base station. The base station determines, via reference to the eTe encryption parameter fields, whether the voice message stream is end-to-end encrypted. Responsive to the base station determining that the voice message stream is not already eTe encrypted, the base station generates a new LLE encryption initialization vector, modifies a corresponding one of the eTe encryption parameter fields to include the new LLE encryption initialization vector, link layer encrypts the voice message stream using the new LLE encryption initialization vector and LLE encryption key, and transmits the link layer encrypted voice message stream over the air for reception by the one or more mobile stations. Alternatively, responsive to the base station determining that the voice message stream is already eTe encrypted, the base station retrieves an existing eTe encryption initialization vector from the one of the eTe encryption parameter fields, link layer encrypts the voice message stream using the existing eTe encryption initialization vector and the LLE encryption key, and transmits the link layer encrypted and eTe encrypted voice message stream over the air for reception by the one or more mobile stations.

Each of these embodiments will be discussed in more detail below, starting with example network and device architectures of the system in which the embodiments may be applied, followed by a discussion of dynamic encryption initialization vector re-use in LLE encrypting, and then LLE encryption and eTe encryption interleaving.

I. Network and Device Architecture

Figure 2:
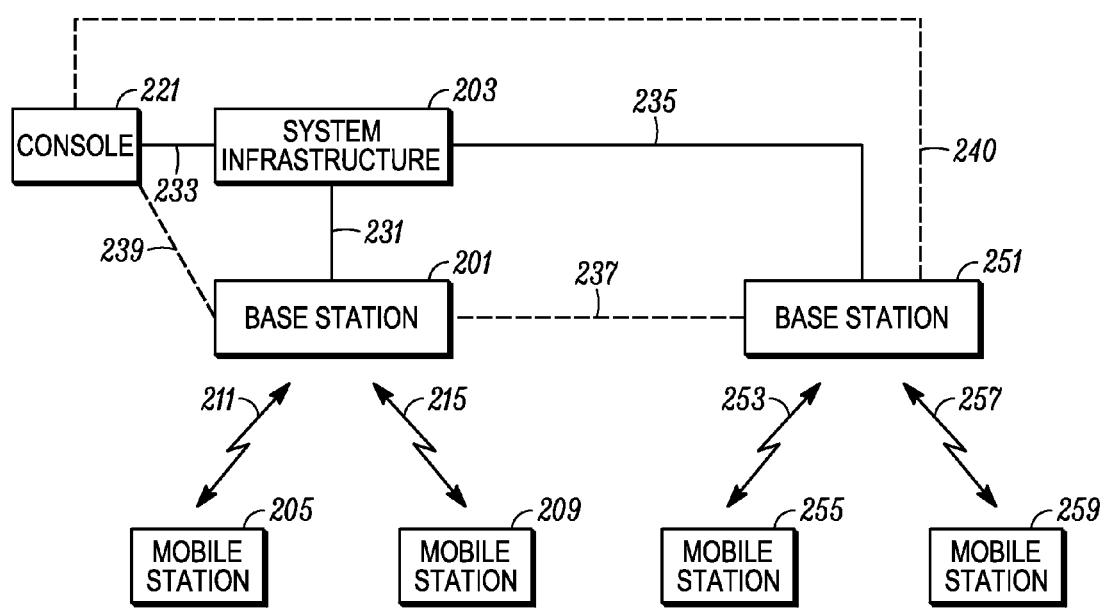
FIG. 2 is a schematic diagram of a wireless communication system in accordance with an embodiment.

FIG. 2 shows a wireless communication system 200 which may be adapted in accordance with an embodiment of the disclosure. It will be apparent to those skilled in the art that the system 200 and the components which are to be described as operating therein may take a number of forms well known to those skilled in the art. Thus, the layout of the system 200, and of its operational components to be described, should be regarded as illustrative rather than limiting. The system 200 of FIG. 2 will be described as an illustrative wireless communication system such as a system capable of operating in accordance with the APCO P25 standard, but may be equally applied to other currently known and/or future standards protocols, such as Digital Mobile Radio (DMR).

The system 200 shown in FIG. 2. includes one or more base stations (BSs) 201, 251 operably connected to a system infrastructure 203 via respective wired or wireless links 231, 235. The BS 201 has radio links with a plurality of mobile stations, particularly mobile stations (MSs) in a service cell or site at least partially defined by a geographic location of the BS 201. In addition to MSs, BS 201 may maintain a direct wireless or wired link 239 (or indirect via system infrastructure 203) with a dispatch console 221 or other operator. The dispatch console 221 may be configured to act as a communications client of BS 201, but may also provide administrator control access to BS 201 so that an administrator may update operational parameters at BS 201. Two MSs 205, 209 are illustrated in FIG. 2 as being within the service area of, and being registered with, BS 201 via respective radio links 211, 215. The BS 201 thereby serves MSs including the MSs 205, 207 with radio communications to and from other terminals, including (i) MSs served by the BS 201, (ii) MSs served by other BSs such as BS 251, (iii) other terminals including MSs in other systems (not shown) operably linked to the system 200 via the system infrastructure 203, and (iv) the console 221.

BS 205 similarly has radio links with a plurality of MSs, particularly MSs in a service cell or site at least partially defined by a geographic location of the BS 205. In addition to MSs, BS 205 may maintain a direct wireless or wired link 240 (or indirect via system infrastructure 203) with the dispatch console 221 or other operator. The dispatch console 221 may be configured to act as a communications client of BS 205, but may also provide administrator control access to BS 205 so that an administrator may update operational parameters at BS 205. Two MSs 255, 257 are illustrated in FIG. 2 as being within the service area of, and being registered with, BS 205 via respective radio links 253, 257. The BS 205 thereby serves MSs including the MSs 255, 257 with radio communications to and from other terminals, including (i) MSs served by the BS 205, (ii) MSs served by other BSs such as BS 201, (iii) other terminals including MSs in other systems (not shown) operably linked to the system 200 via the system infrastructure 203, and (iv) the console 221.

The system infrastructure 203 includes known sub-systems (not shown) required for operation of the system 200. Such sub-systems may include for example sub-systems providing authentication, routing, MS registration and location, system management and other operational functions within the system 200. The system infrastructure 203 may also provide routes to other BSs (not shown) providing cells serving other MSs, and/or may provide access to other types of networks such as a plain old telephone system (POTS) network or a data-switched network such as the Internet. The system infrastructure 203 may also maintain a separate link 233 to the console 221 for supporting voice calls to and from the console 221 and/or for allowing configuration of network elements such as BSs 201, 251 within the system infrastructure 203 from the console 221.

Figure 3:
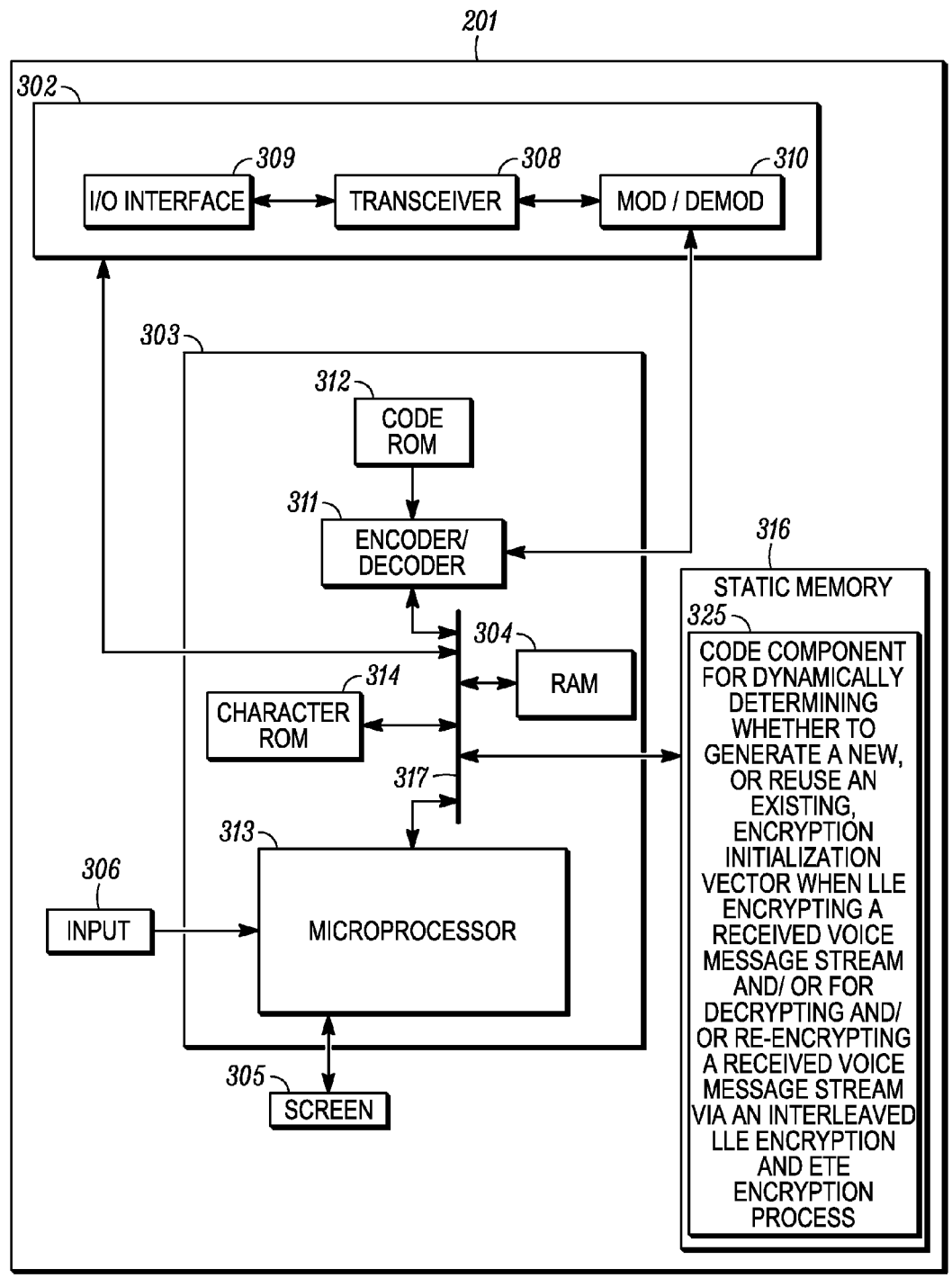
FIG. 3 is a block diagram of an illustrative layout of a base station of the system of FIG. 2.

FIG. 3 is an example functional block diagram of a BS 201 operating within the system 200 of FIG. 2 in accordance with some embodiments. Other BSs such as BS 251 may contain same or similar structures. As shown in FIG. 3, BS 201 includes a communications unit 302 coupled to a common data and address bus 317 of a processing unit 303. The BS 201 may also include an input unit (e.g., keypad, pointing device, etc.) 306 and a display screen 305, each coupled to be in communication with the processing unit 303.

The processing unit 303 may include an encoder/decoder 311 with an associated code Read Only Memory (ROM) 312 for storing data for encoding and decoding voice, data, control, or other signals that may be transmitted or received, between other BSs or MSs in the same radio site as BS 201, or perhaps between other BSs in a remote radio site such as BS 251. The processing unit 303 may further include a microprocessor 313 coupled, by the common data and address bus 317, to the encoder/decoder 311, a character ROM 314, a Random Access Memory (RAM) 304, and a static memory 316.

The communications unit 302 may include one or more wired or wireless input/output (I/O) interfaces 309 that are configurable to communicate with MSs such as MSs 205, 209, with other BSs such as BS 251, with the system infrastructure 203, and/or with the console 221. The communications unit 302 may include one or more wireless transceivers 308, such as a Digital Mobile Radio (DMR) transceiver, an APOCO P25 transceiver, a Bluetooth transceiver, a Wi-Fi transceiver perhaps operating in accordance with an IEEE 802.11 standard (e.g., 802.11a, 802,11b, 802.11g), a WiMAX transceiver perhaps operating in accordance with an IEEE 802.16 standard, and/or other similar type of wireless transceiver configurable to communicate via a wireless network. The communications unit 302 may additionally include one or more wireline transceivers 308, such as an Ethernet transceiver, a Universal Serial Bus (USB) transceiver, or similar transceiver configurable to communicate via a twisted pair wire, a coaxial cable, a fiber-optic link or a similar physical connection to a wireline network. The transceiver 308 is also coupled to a combined modulator/demodulator 310 that is coupled to the encoder/decoder 311.

The microprocessor 313 has ports for coupling to the input unit 306 and to the display screen 305. The character ROM 314 stores code for decoding, or encoding data such as control channel messages and/or data or voice messages that may be transmitted or received by the BS 201. Static memory 316 may store operating code for the microprocessor 313 that, when executed, dynamically determines whether to generate a new, or reuse an existing, encryption initialization vector when LLE encrypting a received voice message stream in accordance with FIG. 6 and the accompanying text, and/or may store operating code for the microprocessor 313 that, when executed, LLE decrypts and/or LLE re-encrypts a received voice message stream via an interleaved LLE encryption and eTe encryption/decryption process in accordance with FIGS. 7-9 and the accompanying text. Static memory 316 may comprise, for example, a hard-disk drive (HDD), an optical disk drives such as a compact disk (CD) drive or digital versatile disk (DVD) drive, a solid state drive (SSD), a tape drive, a flash memory drive, or a tape drive, to name a few.

II. Dynamic Encryption Initialization Vector Re-Use

As set forth above, a BS such as BS 201 of FIG. 2 may implement a dynamic encryption initialization vector re-use algorithm to dynamically generate a new encryption initialization vector for LLE encryption of a received unencrypted voice message stream or re-use an existing encryption initialization vector previously used to eTe encrypt the received voice message stream as the encryption initialization vector for LLE encryption.

Figure 4:
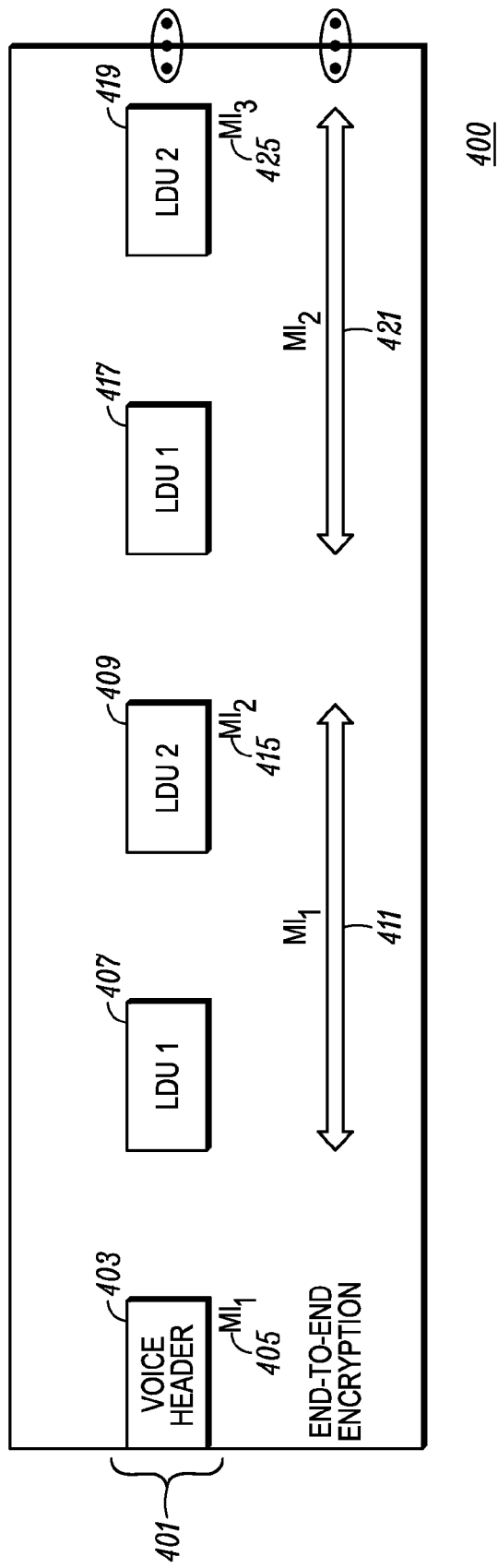
FIG. 4 is a timing diagram of a conventional end-to-end (eTe) encrypted voice message stream that may be used in the system of FIG. 2.

FIG. 4 illustrates a timing diagram 400 of a conventional FDMA eTe encrypted voice message stream 401 in accordance with the APCO P25 standard. As set forth in FIG. 4, a P25 FDMA eTe voice message stream begins with a voice header 403 that includes unencrypted information such as an algorithm ID identifying an encryption algorithm used to eTe encrypt the voice payloads included in subsequent voice payload messages (e.g., logical data units (LDUs) for the APCO P25 FDMA standard), a key ID identifying one out of a plurality of mutually agreed upon keys used to encrypt the voice payloads, and an encryption initialization vector (MI 1 405) for use in decrypting one or more (two for the APCO P25 FDMA standard) subsequent LDUs. Following the voice header is a first superframe that includes a first LDU (LDU 1 407) and a second LDU (LDU 2 409). While the figures in this disclosure use the APCO P25 standard FDMA common air interface for exemplary purposes, which comprises a voice header preceding a plurality of superframes, each superframe consisting of a first LDU containing only voice payload data and a second LDU containing voice payload data with encryption parameters embedded therein for decrypting a subsequent LDU, the exemplary superframe and LDU structure may be replaced with any packetized or framed portion of a digitized voice message stream as long as it includes periodic embedded encryption information similar to the examples set forth herein. For example, a two-slot TDMA access control scheme consistent with the APCO P25 standard that uses one or more voice frames, inter-slot signalling frames, and encryption synchronization signalling frames to transmit the digitized voice message stream and encryption information may be used. Other FDMA and TDMA protocols could be used as well. For example, in the P25 TDMA protocol, a MAC_PTT burst is equivalent to the FDMA voice header and precedes a voice message stream and may include encryption parameters. While the term "voice header" is used throughout the description to designate the particular header used in the FDMA protocol, the term "header" is used in the claims and elsewhere to refer to any generic pre-voice message stream structure including encryption parameters functionally equivalent to the FDMA voice header and TDMA MAC_PTT. Also in the P25 TDMA protocol, 4V and 2V voice bursts are equivalent to the FDMA LDUs, and include embedded encryption parameters. While the term "LDU" is used throughout the description to designate the particular data payload structure used in the FDMA protocol, the term "data unit" is used in the claims and elsewhere to refer to any generic post-header data structure (including voice payload data) adapted to include embedded encryption parameters in at least a portion of the data structure. Any description below with respect to the FDMA voice header is equally applicable to the TDMA MAC_PTT and other similar protocol structures, and any description below with respect to the FDMA LDU is equally applicable to the TDMA burst structure and other similar protocol structures.

Returning to the P25 FDMA example and FIG. 4, the encryption initialization vector MI 1 405 is used to eTe decrypt the encrypted voice payloads in subsequent LDUs LDU 1 407 and LDU 2 409, as indicated by the corresponding MI 1 time period 411. Also embedded within the LDU 2 409 is an algorithm ID, key ID, and second encryption initialization vector (MI 2 415) for eTe decrypting the next superframe (including LDUs LDU 1 417 and LDU 2 419 during the corresponding MI 2 time period 421).

Figure 5:
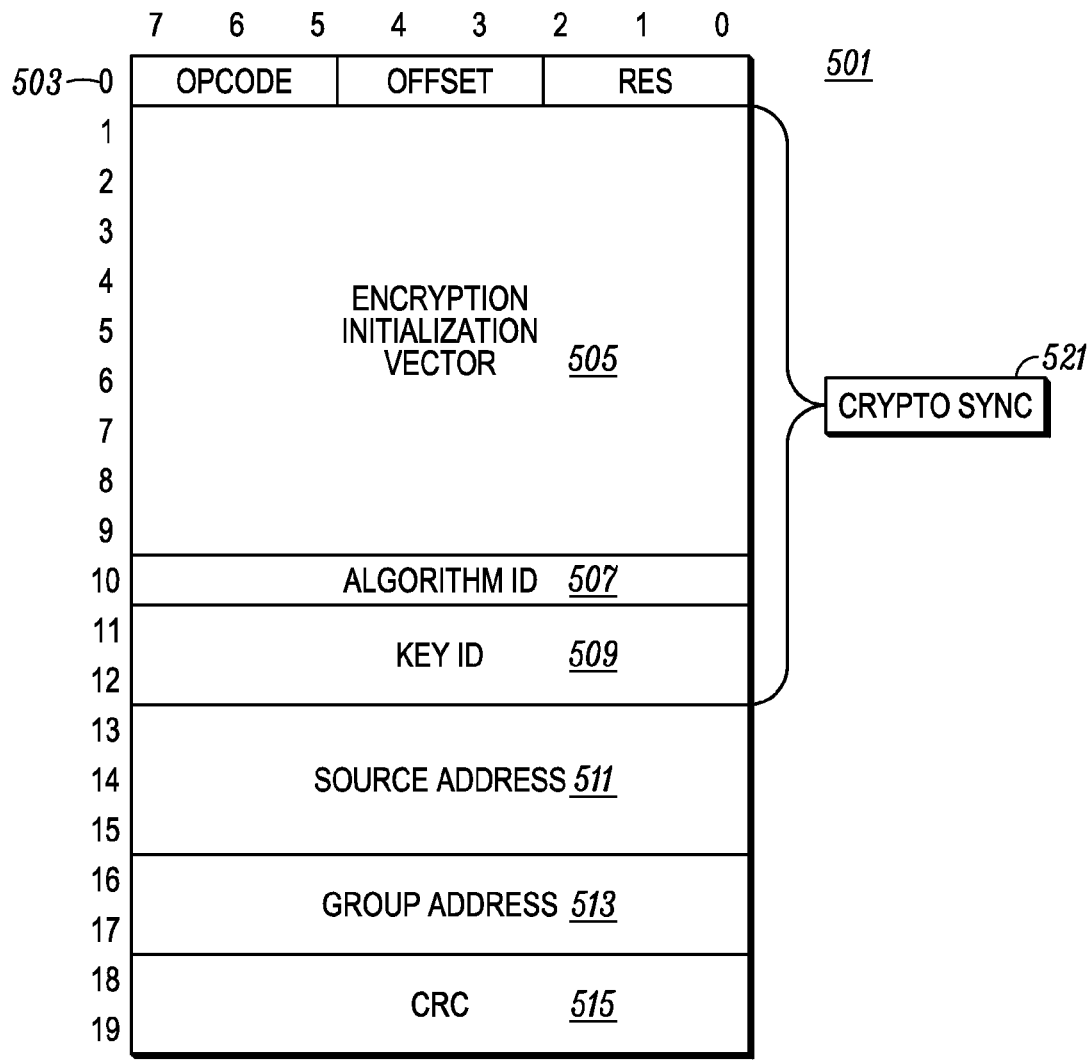
FIG. 5 is an example diagram of a conventional crypto sync that may be included in the voice header or embedded in one or more logical data units (LDU)s in the eTe encrypted voice message stream of FIG. 4.

FIG. 5 sets forth an example data structure 501 that may be used for the voice header 403 and/or LDU 2 409. All or portions of the data structure 501 may be transmitted initially in the voice header 403 and/or may be embedded in the LDU 2 409 in order to allow for late-arriving radios to obtain the encryption/decryption parameters included in the data structure 501. In one example, the data structure 501 may be stored contiguously in the voice header 403 but non-contiguously in the LDU 2 409. As set forth in FIG. 5, the first byte of the data structure 501 may be used to set forth an opcode field and offset field. Bytes 1-9 may be an encryption initialization vector field 505 used to set forth an encryption initialization vector (such as, for example, MI 1 405). The encryption initialization vector 505 is sometimes referred to as a Message Indicator (MI) value. Byte 10 may include an algorithm ID field 507 setting forth an algorithm ID identifying which encryption algorithm, out of a plurality of available algorithms, was used to eTe encrypt the voice payloads in subsequent LDUs. Bytes 11-12 may be a key ID field 509 used to set forth a key ID identifying a shared key, out of a plurality of shared keys, used to encrypt the subsequent voice payloads. Bytes 13-15 may be a source address field 511 used to identify a source MS, console, or other device that generated the voice message stream. Bytes 16-17 may be a group address field 513 used to identify a target group address to which the voice message stream is intended to be transmitted to. Bytes 18-19 may be a cyclic redundancy check (CRC) field 515 setting forth a CRC value used to verify the authenticity and/or correctness of voice payloads included in the voice message stream. Bytes 1-12, including the encryption initialization vector field 505, algorithm ID field 507, and key ID field 509 are sometimes referred to as a crypto sync block 521, as they are the parameters required to encrypt and/or decrypt a particular voice message stream.

As can be seen from FIG. 5, if eTe encryption is used to encrypt the voice payload data in subsequent LDUs, there is no additional space in the data structure 501 for specifying another encryption initialization vector used for LLE encrypting the voice message stream on over-the-air transmissions of the voice message stream between a BS (such as BS 201) and a MS (such as MS 205). While a second voice header, similar to voice header 403, could be added to the voice message stream 401 to specify a second LLE encryption initialization vector, the addition of a second LLE voice header would increase the overhead of the voice message stream, cause increased delay in repeating the voice message stream, and could impair compliance with existing protocol standards, such as APCO P25. LLE encryption would be advantageous, however, to protect information included in such fields as the algorithm ID field 507, the key ID field 509, the source address field 511, and/or the group address field 513 from interception by unintended parties.

Figure 6:
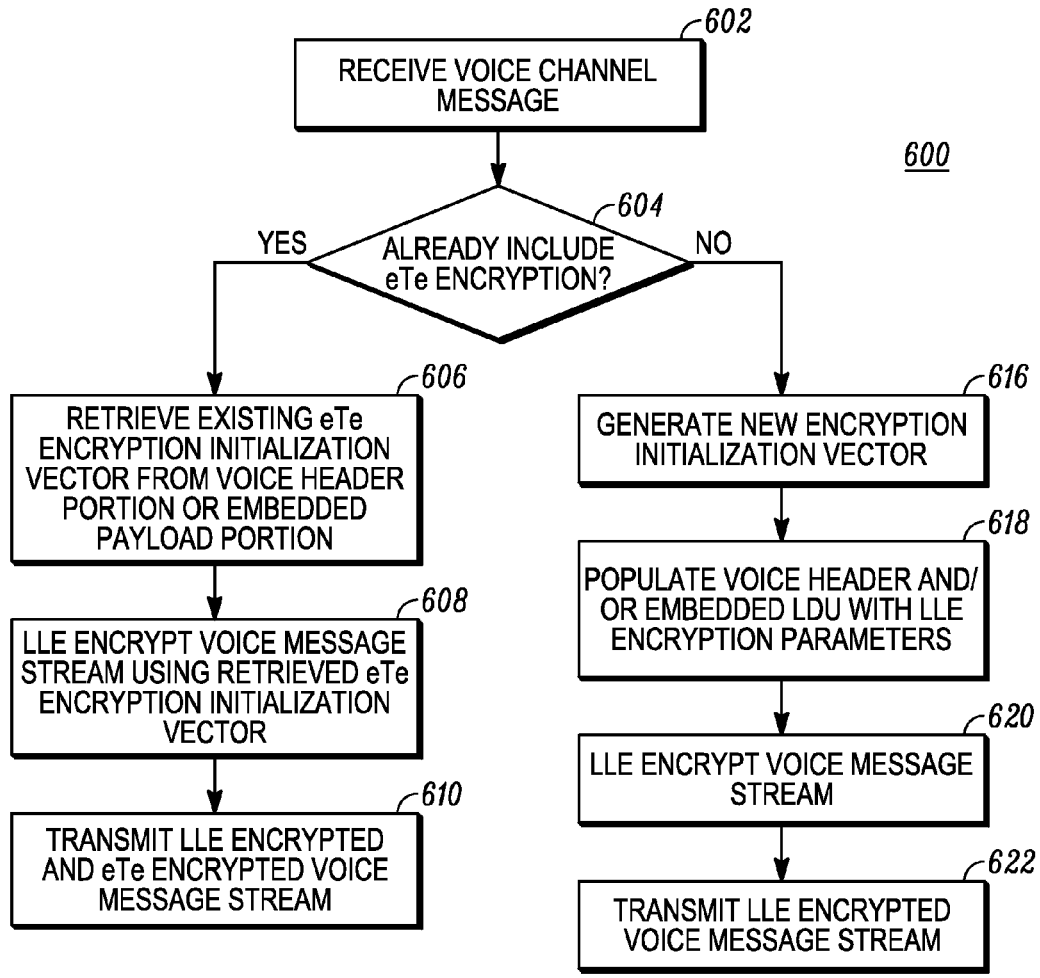
FIG. 6 is a flow chart setting forth an example method of a base station dynamically determining an encryption initialization vector for use in link layer encrypting a voice message stream in accordance with an embodiment.

As set forth in FIG. 6, a BS in accordance with one embodiment is configured to perform a method 600 for dynamically LLE encrypting a voice message stream, already supporting eTe encryption, as a function of whether the voice message stream is already eTe encrypted, without requiring additional LLE voice headers or other signalling overhead. Method 600 begins at step 602, when a BS receives a voice message stream, for example from a console or system infrastructure device, for further transmittal to one or more MSs (or talkgroups) within its coverage area. At step 604, the BS determines whether the received voice message stream is already eTe encrypted. The BS could determine whether the received voice message stream is already eTe encrypted by, for example, determining whether a value of an algorithm identification field contained in a voice header portion or embedded in a payload portion of the voice message stream portion is set to a reserved value indicating an encryption algorithm being used to eTe encrypt the voice message stream. For example, and in accordance with the APCO P25 standard, a hex value of 80 (decimal value 128) indicates an unencrypted message, while a hex value of 84 (132) indicates an AES algorithm encrypted message. Additionally or alternatively, the BS could look to whether a key identification field contained in the voice header portion or embedded in the payload portion of the voice message stream portion is set to a null value or not. For example, and in accordance with the APCO P25 standard, a particular 'reserved' value may be used to indicate that no encryption is used.

If the BS determines at step 604 that the voice message stream is already eTe encrypted, processing continues to steps 606-610 where the encryption initialization vector used for eTe encryption is re-used for LLE encryption. On the other hand, if the BS determines at step 604 that the voice message stream is not already eTe encrypted, processing continues to steps 616-622 where a new LLE encryption initialization vector is generated and embedded in the eTe fields included in the voice header portion or embedded in the payload portion of the voice message stream.

As mentioned, and assuming that the voice message stream is already eTe encrypted, processing continues from step 604 to step 606, where the BS retrieves an existing eTe encryption initialization vector from the one of the voice header portion and payload portion of the voice message stream. The BS may also retrieve one or more of the algorithm ID and/or key ID from the one of the voice header portion and payload portion of the voice message stream for re-use in the LLE encryption process.

At step 608, the BS then LLE encrypts the voice message stream using the retrieved eTe encryption initialization vector, and perhaps also the algorithm ID and/or key ID, to create an LLE encrypted and eTe encrypted voice message stream. During this step, the BS also stores an unencrypted indication of the LLE key ID in the voice message stream (e.g., in a header or embedded in an LDU) so that a receiving device can properly LLE decrypt the LLE encrypted voice message stream. At step 610, the BS then transmits the LLE encrypted and eTe encrypted voice message stream over the air. Upon receipt of the LLE encrypted and eTe encrypted voice message stream, a MS can retrieve the unencrypted LLE encryption initialization vector, LLE decrypt the voice message stream using the LLE encryption initialization vector, and eTe decrypt the payload portion of the voice message stream using, the same encryption initialization vector used for LLE decryption. After LLE and eTe decrypting the voice message stream, the digitized audio can be retrieved from the voice payloads, reassembled, and reproduced at the MS via, for example, a transducer circuit.

Returning to step 604 and assuming, in contrast to the above, that the voice message stream is not already eTe encrypted, processing continues from step 604 to step 616, where the BS generates a new LLE encryption initialization vector, and may also select a new LLE encryption algorithm and a new LLE key. At step 618, the BS populates the encryption parameter fields within a voice header and/or embedded LDU of the voice message stream with the LLE encryption parameters (e.g., the new encryption initialization vector, the new encryption algorithm ID, and/or the new key ID). The encryption parameter fields include at least a pre-existing eTe encryption initialization vector field that is populated with the newly generated LLE encryption initialization vector value. The remaining encryption parameters, including the LLE algorithm ID, LLE key ID, and perhaps others, could fill in unused corresponding and pre-existing eTe fields, or may be stored in separate LLE-dedicated encryption parameter fields, or some combination of the two methods. At step 620, the BS LLE encrypts the voice message stream using the newly generated LLE encryption parameters.

At step 622, the BS then transmits the LLE encrypted (but not eTe encrypted) voice message stream over the air. Upon receipt of the LLE encrypted voice message stream, a MS can retrieve the unencrypted LLE encryption initialization vector (and perhaps the LLE encryption algorithm ID and key ID) from the eTe parameter fields and LLE decrypt the voice message stream using the encryption initialization vector. After LLE decrypting the voice message stream, the digitized audio can be recovered, reassembled, and reproduced at the MS via, for example, a transducer circuit.

Accordingly, by dynamically generating a new LLE encryption initialization vector for LLE encryption of an unencrypted voice message stream or by re-using an existing eTe encryption initialization vector previously used to eTe encrypt the received voice message stream as the encryption initialization vector for LLE encryption, both eTe encrypted and non-eTe encrypted voice message streams can be LLE encrypted, without adding a second header or additional traffic consuming signalling overhead to the voice traffic stream. Additional advantages can be realized as well.

III. Link Layer Encryption and End-to-End Encryption Interleaving

In the case in which it is determined that both LLE and eTe encryption should be added and supported for a voice message stream, increases in processing costs and processing delays at BSs caused by the dual encryption support must be addressed, in addition to addressing situations in which a BS enters an existing dual-encrypted voice message stream late (e.g., the "late-entry" problem). Late-entry generally refers to a device that begins to receive a voice message stream after missing a certain number of headers and/or LDUs that have already been transmitted by a source radio. In one example, a late entering radio misses at least an initial voice header transmitted in accordance with the APCO P25 standard. If for example, the voice message stream 401 of FIG. 4 were modified to LLE encrypt superframes in an identical manner as eTe encryption (e.g., LLE and eTe encrypt the superframe appearing immediately after the appearance of the encryption initialization vector), a late-entering radio that misses the voice header 403 would be required to buffer LDU 2 409, and could not LLE or eTe decrypt either of LDU 407 or LDU 2 409 and could only begin to LLE decrypt LDU1 417 and LDU2 419 after the LDU 2 409 was fully received to obtain the embedded LLE encryption parameters (the LLE key ID and LLE encryption initialization vector). Furthermore, once the LLE encryption parameters were obtained, the late-entering radio would not know until LDU 2 419 is decrypted whether the voice message stream 401 is also eTe encrypted or not. As a result, the method would incur a significant truncation in excess of 720 ms (assuming LDU length of 180 ms consistent with the APCO P25 standard).

Figure 7:
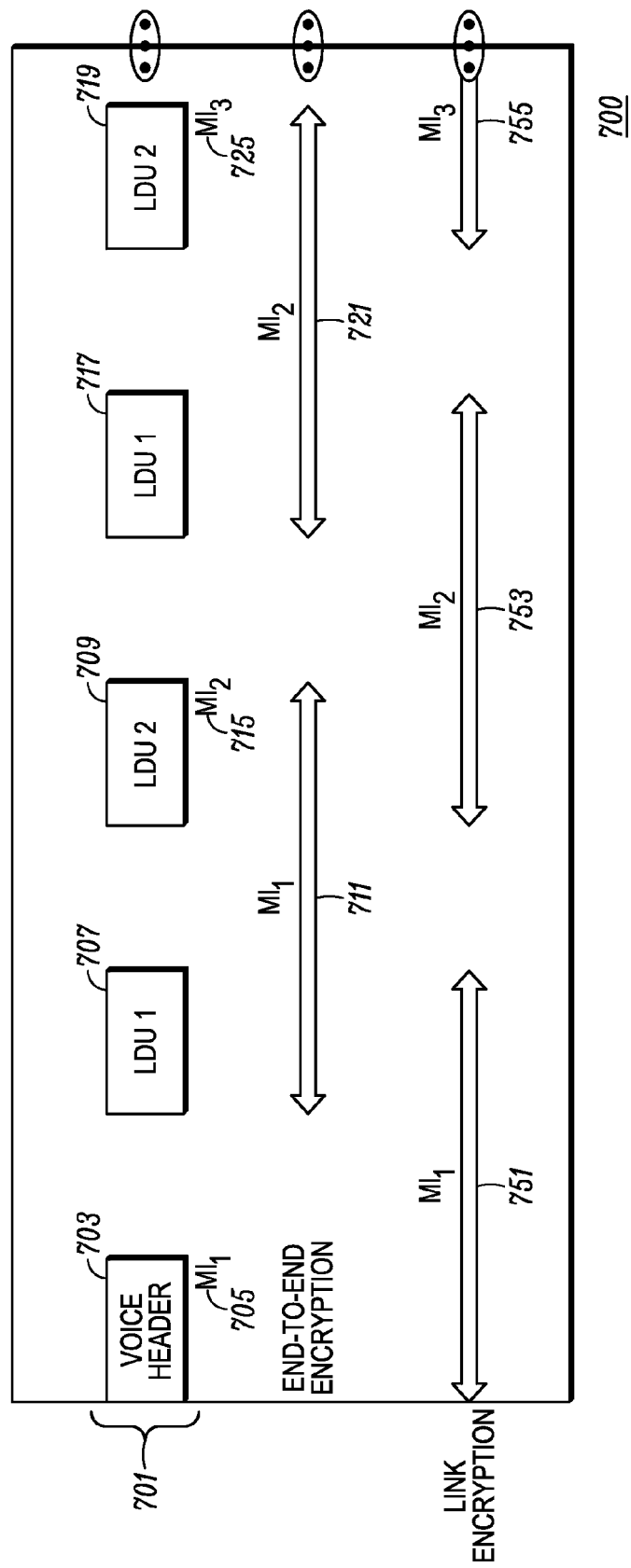
FIG. 7 is a timing diagram illustrating an interleaved offset between link layer encrypted (LLE) LDUs and eTe encrypted LDUs in accordance with an embodiment.

In order to avoid this problem, and as set forth in the timing diagram 700 of FIG. 7, the LLE encrypting of the voice message stream 701 is offset from the eTe encrypting, such that the voice header 703 is LLE encrypted using the encryption initialization vector MI 1 705 included within an unencrypted field of the voice header 703 itself, and subsequent LDUs are alternatingly LLE and eTe encrypted with a same encryption initialization vector and LLE and eTe encrypted with different encryption initialization vectors. For example, LDU 1 707 is illustrated as being eTe and LLE encrypted using the same encryption initialization vector MI 1 705 (e.g., at the overlapping portions of the MI 1 eTe encryption period 711 and the MI 1 LLE encryption period 751). LDU 2 709 includes the second encryption initialization vector MI 2 715 embedded within it, and is eTe encrypted with the encryption initialization vector MI 1 705 but LLE encrypted with the LLE encryption initialization vector MI 2 715. More specifically, and as illustrated in FIG. 7, LDU 2 709 overlaps the MI 1 711 eTe encryption period 711 and the MI 2 753 LLE encryption period 753. While FIG. 7 illustrates an embodiment in which the eTe encryption initialization vectors MI 1 705, MI 2 715, and MI 3 725 are re-used for LLE encryption, in other embodiments, different encryption initialization vectors MIs could be used for eTe and LLE if sufficient timing and/or space is available to separately provide the eTe and LLE encryption initialization vectors in the voice message stream. In the latter case, the header and/or LDU including the separate LLE encryption initialization vector would itself be LLE encrypted using the encryption initialization vectors (in addition to one or more subsequent LDUs) in accordance with the example of FIG. 7. Of course, and as set forth earlier, advantages of re-using an existing eTe encryption initialization vector for LLE encryption, even when interleaved in accordance with FIG. 7, include reduced channel overhead and decreased complexity.

LDUs in the second superframe of FIG. 7 (including second LDU 1 717 and second LDU 2 719) would be LLE and eTe encrypted in a similar manner to LDUs in the first superframe, with the exception that a different set of encryption initialization vectors MI 2 715 and MI 3 725 would be used to LLE and/or eTe encrypt them. Subsequent superframes would be encrypted in a similar manner.

Figure 8:
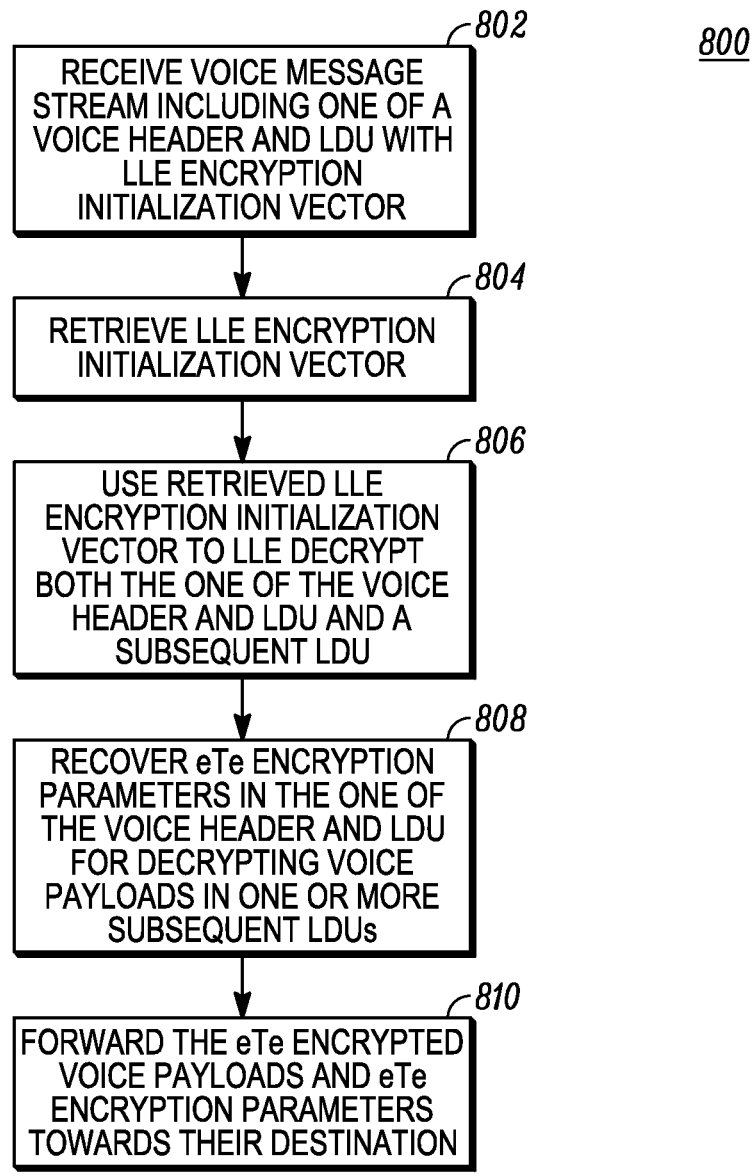
FIG. 8 is a flow chart setting forth an example method of decrypting an LLE and eTe encrypted voice message stream encrypted in the interleaved manner set forth in FIG. 7 in accordance with an embodiment.

FIG. 8 is a flow chart setting forth an example method 800 of decrypting an LLE and eTe encrypted voice message stream encrypted in the interleaved manner set forth in FIG. 7 in accordance with an embodiment. Although method 800 is disclosed with reference to an intermediate BS and includes steps 802-810, in other examples, a fewer number of steps, such as steps 802-808, could be executed at another network element, such as a MS.

Method 800 begins at step 802, when a BS receives a voice message stream including one of a voice header and LDU, the one of the voice header and LDU including an LLE encryption initialization vector for LLE decrypting both the one of the voice header and LDU (e.g., itself) and at least one subsequent LDU. The voice message stream may be received from, for example, a MS operating within range of the BS and destined for another MS or infrastructure device. In an instance of late entry, the BS may have to repeat step 802 one or more times until an entire voice header and/or LDU including an LLE encryption initialization vector is received.

At step 804, the BS retrieves the LLE encryption initialization vector. In the case of a voice header, the LLE encryption initialization vector may be located in a predefined contiguous portion of a voice header data structure similar to that set forth in FIG. 5 (e.g., field 505), and may or may not be the same as the encryption initialization vector used for eTe encryption. In the case of an LDU, the encryption initialization vector may be embedded amongst one or more voice payloads, and may have to be re-assembled from a plurality of locations within the one or more voice payloads (and in this example as well, may be the same as the encryption initialization vector used for eTe encryption). In contrast to FIG. 5, a voice message stream that is both eTe encrypted and LLE encrypted may include separate algorithm ID fields and separate key ID fields to separately identify respective algorithms and keys used for eTe encryption and LLE encryption. While LLE algorithm ID fields and key ID fields must be sent unencrypted to allow the receiving device to LLE decrypt the voice message stream, separately provided eTe algorithm IDs and/or key IDs are preferably LLE encrypted to prevent an eavesdropper from recovering the IDs.

In any event, at step 806, the retrieved LLE encryption initialization vector (and optionally the retrieved algorithm ID and key ID) is used to LLE decrypt both the one of the voice header and LDU, and a subsequent EDU in the voice message stream. LLE decrypted eTe encryption parameters may then be recovered and stored back to the one of the voice header and LDU in unencrypted form or otherwise stored locally for further decryption of the eTe encrypted voice payloads in the voice message stream.

At step 810, the BS forwards the eTe encrypted voice payloads and eTe encryption parameters towards their destination. In the event that the destination is an infrastructure device, the BS may forward the eTe encrypted voice payloads without LLE re-encrypting them. In the event that the destination is a repeat path or broadcast path to MSs operating within a wireless coverage area of the BS, the BS may LLE re-encrypt the voice message stream prior to broadcasting the voice message stream on an assigned RF channel. In the latter case, the BS may re-use the same LLE encryption parameters recovered in step 806 (which may or may not be the same as the eTe encryption parameters recovered in step 808), or may generate new LLE encryption parameters.

Figure 9:
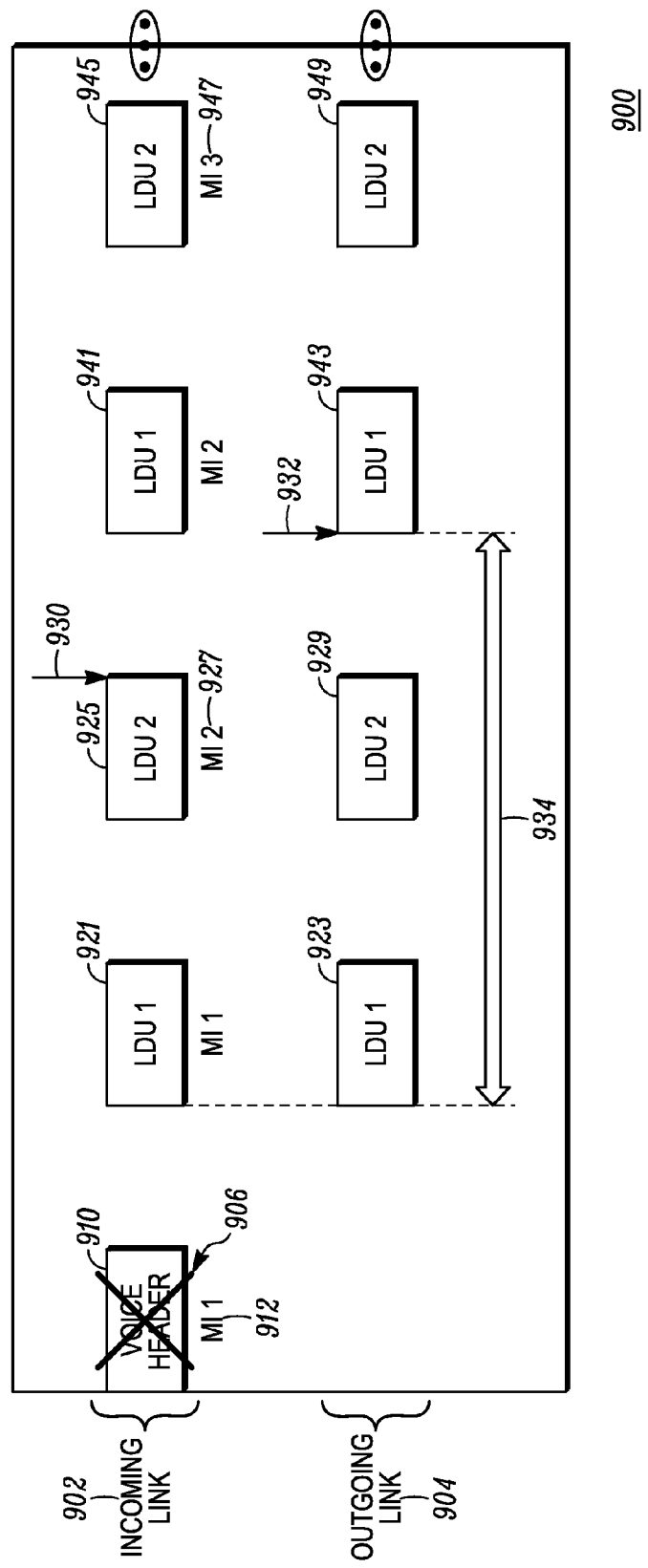
FIG. 9 is a timing diagram illustrating one of several ways of delaying and/or truncating a portion of an LLE and/or eTe encrypted voice message stream encrypted in the interleaved manner set forth in FIG. 7 upon late entry in accordance with an embodiment.

FIG. 9 illustrates an example timing diagram 900 in which the method 800 may be applied, and illustrates some of the advantages of interleaving LLE and eTe encryption in the manner set forth above for a late entering BS or other device ("receiving device"). Illustrated in FIG. 9 is an incoming link 902 that includes an eTe and LLE encrypted voice message stream, and an outgoing link 904 that may be, for example, an LLE re-encrypted and eTe encrypted voice message stream broadcast over the air, an eTe encrypted voice message stream transmitted to another infrastructure device via an infrastructure network link, an LLE and eTe decrypted audio stream transmitted towards a transducer for reproduction in a MS, or some other type of stream.

In a first example, assume that the receiving device enters the stream late, at the time indicated by arrow 906, and does not receive enough information from the voice header 910 (and especially does not receive the encryption initialization vector MI 1 912) to LLE decrypt the voice header 910 or the subsequent LDU LDU 1 921. In accordance with method 800, the receiving device continues monitoring the incoming link 902 until a fully decodable voice header or LDU with embedded LLE encryption parameters (e.g., an LDU 2 in this example in accordance with the APCO P25 standard) is received (step 802). in accordance with FIG. 9, a subsequent LDU LDU 1 921 is received but cannot be decrypted by the receiving device because the receiving device does not have the encryption initialization vector MI 1 912 necessary to LLE decrypt it. A subsequently received LDU LDU 2 925 does, however, include an embedded (unencrypted) encryption initialization vector MI 2 927 for decoding it and one or more subsequent LDUs. Accordingly, the receiving device, is able to decrypt and retrieve the embedded encryption initialization vector MI 2 927 (and potentially other encryption parameters such as an LLE key ID, LLE algorithm ID, etc.) from the LDU 2 925 (e.g., the same LDU that the encryption parameters were retrieved from) at the time indicated by arrow 930 (step 804).

Once the LLE encryption parameters are retrieved from LDU 2 925 and the LDU LLE decrypted, the eTe encryption parameters can he decrypted (step 806), recovered, and stored back into the voice message stream or locally at the receiving device in their unencrypted form (step 808). Because the encryption initialization vector MI 2 927 retrieved from LDU 2 925 is also used to LLE decrypt a subsequent LDU LDU 1 941, the receiving device can begin LLE and eTe decoding LDU 1 941 and, assuming the receiving device is a BS and the destination of the voice message stream an infrastructure device, provide the LLE decrypted (but still eTe encrypted) voice message stream on the outgoing link 904 beginning at the time indicated by arrow 932 (step 810). In this example, LDUs LDU 1 941 and LDU 2 945 are LLE decrypted and provided on the outgoing link 904 via repeated LDUs LDU 1 943 and LDU 2 949. In accordance with some protocols such as the P25 protocol, which requires that eTe encryption parameters be provided in a prior superframe for decrypting a subsequent superframe, eTe encryption parameters may be provided on the outgoing link 904 by transmitting at least a portion of the LLE decrypted LDU 2 929 with the embedded eTe encryption parameters on the outgoing link 904 prior to the time indicated by arrow 932.

As illustrated in FIG. 9, in this example, a new encryption initialization vector is provided for every two LDUs, such that a new (different) encryption initialization vector MI 3 947 is embedded in LDU 2 945 and used to LLE decrypt LDU 2 945 and a subsequent LDU. While, in this example, a new encryption initialization vector is provided for every two LDU's, other increments could be used, including every 3-10 LDUs or more, and the increment could be static or could vary over time.

In a second example, and assuming the receiving device is a BS and the destination of the voice message stream is a MS within the geographic coverage area of the BS, the receiving device may re-LLE encrypt the received voice message stream (after recovering the destination group ID, etc. from the voice message stream on the incoming link 902) using the same encryption initialization vector that was recovered, and then broadcast the re-LLE encrypted and eTe encrypted voice message stream on the outgoing (wireless) link 904 (step 810).

In a third example, and assuming the receiving device is a MS and outgoing link 904 an internal path towards a transducer in the MS for reproducing the voice payload in the voice message stream, the receiving device may also eTe decrypt the voice message stream received on the incoming link 902 and provide the LLE decrypted and eTe decrypted voice message stream on the outgoing link 904 towards the transducer. With reference to FIG. 9, while the encryption initialization vector MI 2 927 is used to LLE decrypt the LDUs LDU 2 925 and LDU 1 941, it is also used to eTe decrypt voice payloads in subsequent LDUs LDU 1 941 and LDU 2 945. Accordingly, while a same encryption initialization vector MI 2 927 is used to LLE decrypt and eTe decrypt LDU 1 941. different encryption initialization vectors are used to LLE decrypt (MI 3 947) and eTe decrypt (MI 2 927) the subsequent LDU 2 945.

In the example set forth in FIG. 9, and assuming the voice message stream on the incoming link 902 is both eTe and LLE encrypt, LDUs LDU 1 921 and LDU 2 925 are at least partially discarded, and thus no corresponding complete LDUs LDU 1 923 or LDU 2 929 are placed on the outgoing link 904, incurring a truncation period equal to approximately the length of the LDUs LDU 1 921 and LDU 2 925. Assuming, in accordance with the APCO P25 standard, that each LDU is approximately 180 ms, the outgoing, link 904 incurs approximately a 360 ms (or less) truncation relative to the incoming link 902, which substantially improves upon the 720 ms delay described earlier.

Alternatively, and assuming the voice message stream on the incoming link 902 is only LLE encrypted and not eTe encrypted, LDU 1 921 is discarded (as is corresponding LDU 1 923 on the outgoing link 904, causing a 180 ms truncation) and LDU 2 925 is decrypted (once the LLE parameters embedded in the LDU 2 925 are retrieved at point 930) and delayed on the outgoing link 904 by one LDU (e.g., 180 ms in this example). Accordingly, repeated LDU 2 929 (and all subsequent LDUs) in FIG. 9 would be shifted to the right by one position (180 ms). In order to avoid delay on the outgoing link 904, and in an alternative embodiment, the receiving device could instead be configured to incur a full 360 ms truncation (discarding repeated LDUs LDU 1 923 and LDU 2 929 on the outgoing link) and immediately begin transmitting repeated LDU 1 943 (corresponding to LDU 1 941 on the incoming link 902) on the outgoing link 904 without incurring any further delay. Other examples are possible as well.

In light of the foregoing, and by interleaving the encryption initialization vector used for LLE and/or eTe encryption and/or using an embedded LLE encryption initialization vector to LLE decrypt both a current LDU and one or more subsequent LDUs, a more efficient LLE and/or eTe encryption and decryption process can be implemented, resulting in less truncation and/or delay of encrypted voice message streams. Other benefits are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has includes, contains a list of elements does not include only those elements but may include other elements not expressly listed, or inherent to such process, method, article, or apparatus. An element proceeded by "comprises . . . a", "has a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined, as being close to as understood by one of ordinary skill in the art, and in one non-limiting embodiment the term is defined, to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of decrypting and encrypting link layer encrypted (LLE) and end-to-end encrypted (eTe) voice message streams at a wireless communications device, the method comprising:
receiving, by the wireless communications device, one of a header and a data unit of a voice message stream, the one of the header and the data unit including an LLE encryption initialization vector embedded therein;
retrieving, by the wireless communications device, the LLE encryption initialization vector from the one of the header and the data unit;
using, by the wireless communications device, the retrieved LLE encryption initialization vector to link layer decrypt both (i) the one of the header and the data unit and (ii) a subsequent data unit of the voice message stream following the one of the header and the data unit;
recovering, by the wireless communications device, eTe encryption parameters in the one of the header and the data unit for decrypting eTe encrypted voice payloads in one or more subsequent data units in the voice message stream; and
forwarding, by the wireless communications device, the eTe encryption parameters and voice payloads towards their destination.

2. The method of claim 1, wherein the retrieved encryption initialization vector is used for both the link layer encryption of the one of the header and the second data unit and the eTe encryption of the eTe encrypted voice payloads in one or more subsequent data units in the voice message stream.

3. The method of claim 1, wherein the wireless communications device is a base station, and wherein forwarding voice payloads towards their destination comprises the base station transmitting the voice payloads towards their destination to one of another base station in a network of base stations and a console communicatively coupled to the base station.

4. The method of claim 1, wherein the wireless communications device is a base station, and wherein forwarding voice payloads towards their destination comprises re-LLE encrypting the voice payloads via a LLE process using the retrieved encryption initialization vector and broadcasting the LLE and eTe encrypted voice payloads via a wireless transmitter.

5. The method of claim 1, wherein the wireless communications device is a mobile station, and wherein forwarding voice payloads towards their destination comprises forwarding the voice payloads towards a transducer for reproduction in the mobile station.

6. The method of claim 1, wherein the wireless communications device receives the header of the voice message stream.

7. The method of claim 1, wherein the wireless communications device enters the voice message stream late and receives the second data unit of the voice message stream.

8. The method of claim 7, wherein the wireless communications device enters the voice message stream late and receives only a partial portion of a first particular second data unit, and continues receiving data units in the voice message stream, discarding first data units, until a complete second particular second data unit is received.

9. The method of claim 1, wherein using the retrieved encryption initialization vector to link layer decrypt both (i) the one of the header and the second data unit and (ii) a first data unit of the voice message stream following the one of the header and the second data unit comprises:
retrieving from the one of the header and the second data unit encryption parameters including at least a key identifier, and link layer decrypting both (i) the one of the header and the second data unit and (ii) a first data unit of the voice message stream following the one of the header and the second data unit using the retrieved encryption initialization vector and the retrieved key identifier.

10. The method of claim 1, wherein the link layer decryption is performed without receiving a separate header in the voice message stream setting forth link layer encryption parameters.

11. A wireless communications device in a wide area radio network comprising a plurality of network locations, the wireless communications device comprising:
- a wireless receiver;
- a wireless transmitter;
- a processor; and
- a computer readable medium having instructions stored thereon that, in response to execution by the processor, cause the base station to perform operations comprising:
  - receiving, via the wireless receiver, one of a header and a data unit of a voice message stream, the one of the header and the data unit including an LLE encryption initialization vector embedded therein;
  - retrieving the LLE encryption initialization vector from the one of the header and the data unit;
  - using the retrieved LLE encryption initialization vector to link layer decrypt both (i) the one of the header and the data unit and (ii) a subsequent data unit of the voice message stream following the one of the header and the data unit;
  - recovering eTe encryption parameters in the one of the header and the data unit for decrypting eTe encrypted voice payloads in one or more subsequent data units in the voice message stream; and
  - forwarding the eTe encryption parameters and voice payloads towards their destination.

12. A method of link layer encrypting an over-the-air transmission from a base station to one or more mobile stations, the method comprising:
- the base station receiving a voice message stream, including one of a header portion and a voice payload portion, having end-to-end (eTe) encryption parameter fields embedded therein, for transmission to one or more mobile stations operating within a coverage area associated with the base station;
- the base station determining, via reference to the eTe encryption parameter fields, whether the voice message stream is eTe encrypted;
- responsive to the base station determining that the voice message stream is not already eTe encrypted, the base station generating a new link layer encryption (LLE) encryption initialization vector, modifying a corresponding one of the eTe encryption parameter fields to include the new LLE encryption initialization vector, link layer encrypting the voice message stream using the new LLE encryption initialization vector, and transmitting the link layer encrypted voice message stream over the air for reception by the one or more mobile stations; and
- responsive to the base station determining that the voice message stream is already eTe encrypted, the base station retrieving an existing eTe encryption initialization vector from the one of the eTe encryption parameter fields, link layer encrypting the voice message stream using the existing eTe encryption initialization vector, and transmitting the LLE encrypted and eTe encrypted voice message stream over the air for reception by the one or more mobile stations.

13. The method of claim 12, wherein transmitting the LLE encrypted voice message stream over the air for reception by the one or more mobile stations comprises transmitting the LLE encrypted voice message stream over the air via one of a Time Division Multiple Access (TDMA) and Frequency Division Multiple Access (FDMA) protocol.

14. The method of claim 13, where transmitting the LLE encrypted voice message stream over the air for reception by the one or more mobile stations comprises transmitting the LLE encrypted voice message stream over the air in accordance with a P25 protocol.

15. The method of claim 12, wherein the base station determines that the voice message stream does not include eTe encryption, generates a new encryption initialization vector, modifies a corresponding field of the header portion to include the new encryption initialization vector, link layer encrypts the voice message stream using the new encryption initialization vector, and transmits the LLE encrypted voice message stream over the air for reception by the one or more mobile stations.

16. The method of claim 12, wherein the base station determines that the voice message stream does include eTe encryption, retrieves the existing eTe encryption initialization vector from the header portion, link layer encrypts the voice message stream using the existing eTe encryption initialization vector, and transmits the LLE encrypted and eTe encrypted voice message stream over the air for reception by the one or more mobile stations.

17. The method of claim 12, wherein determining whether the voice message stream includes eTe encryption comprises determining that one or both of (i) an algorithm identification field contained in the one of the header portion and the voice payload portion is set to a reserved value indicating an encryption algorithm being used to end-to-encrypt the voice message stream and (ii) a key identification field contained in the in the one of the header portion and the voice payload portion is set to a reserved value.

18. The method of claim 12, wherein the header portion of the voice message stream contains available space to support only a single encryption initialization vector.

19. The method of claim 12, wherein the base station receives the voice message stream from another infrastructure device via an infrastructure network interface.

20. A base station in a wide area radio network comprising a plurality of network locations, the base station comprising:
- a wireless transmitter;
- a network interface;
- a processor; and
- a computer readable medium having instructions stored thereon that, in response to execution by the processor, cause the base station to perform operations comprising:
  - receiving a voice message stream, including one of a header portion and a voice payload portion, having end-to-end (eTe) encryption parameter fields embedded therein, for transmission to one or more mobile stations operating within a coverage area associated with the base station;
  - determining, via reference to the eTe encryption parameter fields, whether the voice message stream is eTe encrypted;
  - responsive to the base station determining that the voice message stream is not already eTe encrypted, the base station generating a new link layer encryption (LLE) encryption initialization vector, modifying a corresponding one of the eTe encryption parameter fields to include the new LLE encryption initialization vector, link layer encrypting the voice message stream using the new LLE encryption initialization vector, and transmitting the link layer encrypted voice message stream over the air for reception by the one or more mobile stations; and
  - responsive to the base station determining that the voice message stream is already eTe encrypted, the base station retrieving an existing eTe encryption initialization vector from the one of the eTe encryption parameter fields, link layer encrypting the voice message stream using the existing eTe encryption initialization vector, and transmitting the LLE encrypted and eTe encrypted voice message stream over the air for reception by the one or more mobile stations.

* * * * *

UNITED STATES PATENT AND TRADEMARK OFFICE
CERTIFICATE OF CORRECTION

PATENT NO. : 8,824,681 B2
APPLICATION NO. : 13/671744
DATED : September 2, 2014
INVENTOR(S) : Thomas J. Senese et al.

It is certified that error appears in the above-identified patent and that said Letters Patent is hereby corrected as shown below:

On the Title Page, Item 57, under "ABSTRACT", in Column 2, Line 11, delete "and ii it is not" and insert -- and if it is not, --, therefor.

On Title Page 2, Item 56, under "OTHER PUBLICATIONS", in Column 1, Line 7, delete ""Terestrial" and insert -- "Terrestrial --, therefor.

IN THE SPECIFICATION:

In Column 1, Line 9, delete "and or" and insert -- and/or --, therefor.

In Column 1, Line 39, delete "regarding," and insert -- regarding --, therefor.

In Column 1, Line 48, delete "use" and insert -- user --, therefor.

In Column 3, Line 43, delete "system." and insert -- system; --, therefor.

In Column 3, Line 45, delete "embodiment." and insert -- embodiment; --, therefor.

In Column 3, Line 47, delete "FIG. 2." and insert -- FIG. 2; --, therefor.

In Column 3, Line 50, delete "FIG. 2." and insert -- FIG. 2; --, therefor.

In Column 3, Line 53, delete "(LDU)s" and insert -- (LDUs) --, therefor.

In Column 3, Line 54, delete "FIG. 4." and insert -- FIG. 4; --, therefor.

In Column 4, Line 3, delete "embodiment;" and insert -- embodiment. --, therefor.

In Column 4, Line 8, delete "P25" and insert -- P25, --, therefor.

Signed and Sealed this
Thirty-first Day of May, 2016

Michelle K. Lee
*Director of the United States Patent and Trademark Office*

CERTIFICATE OF CORRECTION (continued)
U.S. Pat. No. 8,824,681 B2

IN THE SPECIFICATION:

In Column 4, Line 21, delete "as second" and insert -- a second --, therefor.

In Column 5, Line 15, delete "FIG. 2." and insert -- FIG. 2 --, therefor.

In Column 6, Line 16, delete "received," and insert -- received --, therefor.

In Column 6, Line 33, delete "802, 11b," and insert -- 802.11b, --, therefor.

In Column 6, Line 47, delete "decoding," and insert -- decoding --, therefor.

In Column 8, Lines 16-17, delete "Message." and insert -- Message --, therefor.

In Column 9, Line 50, delete "using," and insert -- using --, therefor.

In Column 10, Line 41, delete "If" and insert -- If, --, therefor.

In Column 10, Line 48, delete "LDU 407" and insert -- LDU 1407 --, therefor.

In Column 12, Line 10, delete "EDU" and insert -- LDU --, therefor.

In Column 12, Line 52, delete "in" and insert -- In --, therefor.

In Column 12, Line 59, delete "device," and insert -- device --, therefor.

In Column 13, Line 1, delete "he" and insert -- be --, therefor.

In Column 13, Line 39, delete "recovered," and insert -- recovered --, therefor.

In Column 13, Line 55, delete "941." and insert -- 941, --, therefor.

In Column 13, Line 67, delete "outgoing," and insert -- outgoing --, therefor.

In Column 14, Line 54, delete "has" and insert -- has, --, therefor.

In Column 14, Line 56, delete "listed," and insert -- listed --, therefor.

In Column 14, Line 58, delete ""has a"," and insert -- "has...a", --, therefor.

In Column 14, Line 65, delete "defined," and insert -- defined --, therefor.

In Column 14, Line 67, delete "defined," and insert -- defined --, therefor.

CERTIFICATE OF CORRECTION (continued)
U.S. Pat. No. 8,824,681 B2

IN THE CLAIMS:

In Column 15, Line 65, in Claim 1, delete "retrieving,by" and insert -- retrieving, by --, therefor.

In Column 18, Lines 27-28, in Claim 17, delete "in the in the" and insert -- in the --, therefor.